(12) United States Patent
Edwards et al.

(10) Patent No.: US 8,411,841 B2
(45) Date of Patent: Apr. 2, 2013

(54) REAL-TIME AGENT ASSISTANCE

(75) Inventors: Gordon Edwards, Stockbridge, GA (US); John Willcutts, Marietta, GA (US); Jon W. Ezrine, Milton, GA (US); Marsal Gavalda, Sandy Springs, GA (US)

(73) Assignee: Nexidia Inc., Atlanta, GA (US)

( * ) Notice: Subject to any disclaimer, the term of this patent is extended or adjusted under 35 U.S.C. 154(b) by 253 days.

(21) Appl. No.: 12/837,694

(22) Filed: Jul. 16, 2010

(65) Prior Publication Data
US 2011/0033036 A1 Feb. 10, 2011

Related U.S. Application Data

(60) Provisional application No. 61/231,758, filed on Aug. 6, 2009.

(51) Int. Cl.
*H04M 3/00* (2006.01)
(52) U.S. Cl. ......... 379/265.05; 379/265.06; 379/265.07; 379/265.08; 379/265.11; 379/265.12

(58) Field of Classification Search ............... 379/265.05–266.02, 88.01, 88.14, 379/88.16; 704/270.7
See application file for complete search history.

(56) References Cited

U.S. PATENT DOCUMENTS

| | | | |
|---|---|---|---|
| 2004/0008828 A1* | 1/2004 | Coles et al. | 379/88.01 |
| 2005/0216269 A1* | 9/2005 | Scahill et al. | 704/270.1 |

* cited by examiner

*Primary Examiner* — Joseph J Nguyen
(74) *Attorney, Agent, or Firm* — Occhiuti Rohlicek & Tsao LLP

(57) ABSTRACT

Some general aspects of the invention relate to systems and methods for improving contact center agent performance, for instance, by integrating real-time call monitoring with speech analytics to present agents with information useful to the handling of the current calls. In some implementations, phonetically based speech analysis techniques are applied to process live audio streams to identify key words and/or phrases of relevance, based on which knowledge articles can be selectively presented to agents to drive more efficient business processes.

11 Claims, 7 Drawing Sheets

FIG. 3

FIG. 4

NEXIDIA Real Time Monitoring
File  Edit  Tools  Help

Topic Administration

Topics
- Frustration
- Transfer
- Promotion
- <Other Category>
- <Other Category>

[ New... ]   [ Delete ]

Phrases | Actions |

Frustration

| Phrase | Party | Action | Accuracy | |
|---|---|---|---|---|
| this is ridiculous | caller | Article: Showing Empathy | 98 | Edit... |
| I don't believe it | either | http://intranet.us.com/e... | 99 | Edit... |
| you can't be serious | caller | Web Service: <name here> | 92 | Edit... |
| you're not helping | caller | http://intranet.us.com/e... | 95 | Edit... |
| i'm sorry you feel that way | agent | Article: Showing Empathy | 96 | Edit... |

"you can't be serious"

Date Added:          08/14/2008 - 12:15 PM     Threshold:          91
Number of Alerts:    376                       Drill-Throughs: 206
Last Alerts:         10/15/2008 - 4:47 PM

FIG. 5

NEXIDIA Real Time Monitoring – Knowledge Base Administration

File  Edit  Tools  Help

*Article Administration*

Content

- Showing Empathy
- Diffusing Tension with the Customer
- Promoting Our Products
- Intranet - Empathy
- Intranet - Promotions
- Intranet - Upselling
- Service - Service Name Here
- Service - Other Svc Name

[ New... ]  [ Edit... ]  [ Delete ]

Name  Showing Empathy

Summary  Basic of showing empathy to customer in time of frustration. Includes key phrases to use.

Type  Knowledgebase Article ⌄

Source  [                    ]  [ Browse... ]

Preview

Showing Empathy

Lorem ipsum dolor sit amet, consectetuer adipiscing elit. Morbi neque quam, porta non, euismod nec, hendrerit non, ligua. Cum sociis natoque penatibus et magnis dis parturient montes, nascetur ridiculus mus. Phasellus vulputate, nisl ut adipiscing egestas, nisl ipsum cursus lacus, ac accumsan nibh magna sed massa. Sed conque, sapien ac ornare tincidunt nulla pede auctor nulla, id aliquet est leo et nunc. Praesent eu metus eget nisl condimentum porttitor. In tortor risus, semper non, vulputata vitae, laoreet placerat, orci Curabitur magna. Integer felis elit, ultrices et, blandit et, lacinia ac, magna. Cras nulla. Suspendisse posuere oric nec est. Curabitur ligula pede, imperdiet sit amet, posuere at, vehicula in, purus. Mauris aliquet enim quis lectus. Praesent quam tellus, eleifend nec, viverra sit amet, semper a, nibh. Aliquam malesuada.

Proin vehicula blandit felis. Ut adipiscing. Pellentesque habitant morbi tristique senectus et netus et malesuada fames ac turpis egestas. Morbi sit amet leo. Etiam egestas mauris id nulla. Pellentesque dignissim eros sit amet pede. Nullam ac libero in nisl consectetuer blandit. Vivamus et dui. Vestibulum sit amet nulla. Class aptent taciti sociosqu ad litora torquent per conubia nostra, per inceptor himanaeos. Cum sociis natoque penatibus et

REAL-TIME AGENT ASSISTANCE

CROSS-REFERENCE TO RELATED APPLICATIONS

This application claims the benefit of U.S. Application Ser. No. 61/231,758, filed Aug. 6, 2009, and entitled "Real-Time Agent Assistance", the contents of which are incorporated herein by reference.

BACKGROUND

This document relates to systems and methods for providing real-time agent assistance.

A contact center provides a communication channel through which business entities can manage their customer contacts. In addition to handling various customer requests, a contact center can be used to deliver valuable information about a company to appropriate customers and to aggregate customer data for making business decisions. Improving the efficiency and effectiveness of agent-customer interactions can result in greater customer satisfaction, reduced operational costs, and more successful business processes.

SUMMARY

Some general aspects of the invention relate to systems and methods for improving contact center agent performance, for instance, by integrating real-time call monitoring with speech analytics to present agents with information useful to the handling of the current calls. In some implementations, phonetically based speech analysis techniques are applied to process live audio streams to identify key words and/or phrases of relevance, based on which knowledge articles can be selectively presented to agents to drive more efficient business processes.

One aspect, in general, relates to techniques for providing agent assistance based on the content of real-time conversations. For example, a word spotting engine of a contact center system is used to process audio data representative of an interaction between a contact center caller and a contact center agent. The word spotting engine identifies, in the audio data, putative occurrences of one or more keyphrases of a predefined set of keyphrases. A candidate set of knowledge articles is selected from a predefined set of knowledge articles that is stored in a machine-readable data store for presentation to the contact center agent. The selection is performed based at least in part on a determined relevance of each article of the candidate set to the putative occurrences of the one or more keyphrases, and also based in part on data stored in association with the contact center caller (e.g., metadata associated with the caller). During the ongoing interaction between the contact center agent and the contact center caller, visual representations of selected knowledge articles of the candidate set are presented on a display terminal associated with the contact center agent.

Embodiments may include one or more of the following features.

In some embodiments, the word spotting engine is configured to process the audio data to identify time locations in the audio data at which a spoken instance of a keyphrase of the predefined set of keyphrases is likely to have occurred based on a comparison of data representing the audio data with data representing spoken instances of at least some of the keyphrases of the predefined set.

Relevance scores may be assigned to knowledge articles of the predefined set, with each relevance score representing a measure of relevance of its respective knowledge article to the putative occurrences of one or more keyphrases. In some examples, a knowledge article of the predefined set may be designated as belonging to a candidate set of knowledge articles based on a comparison of its respective relevance score to a threshold score. The relevance scores may be generated by processing a first segment of the audio data to generate an initial relevance score, and subsequently by processing one or more additional segments of the audio data to iteratively update the initial relevance score.

The data stored in association with the contact center caller can include, for example, data characterizing an identity of the caller, data characterizing a caller-specific history of contact center interactions, and data characterizing a caller-specific history of product acquisition, service use, or both.

In some examples, each of the selected knowledge articles of the candidate set is associated with a relevance score that exceeds a threshold score. The relevance scores associated with the selected knowledge articles of the candidate set are compared to identify the knowledge article of the candidate set that is most relevant to the interaction between the contact centre caller and the contact center agent. Subsequently, a visual representation of the identified knowledge article of the candidate set is generated for presentation to the agent.

In some further examples, prior to comparing the relevance scores associated with the selected knowledge articles of the candidate set, audio data representative of an immediately prior portion of the interaction between the contact center caller and the contact center agent are processed, and the result of the processing is used to update the relevance score associated with each of the selected knowledge articles of the candidate set based on a result of the processing.

Examples of the predefined set of knowledge articles include content associated with promotions, incentives, products, product accessories, services, service enhancements, and agent-assisting content.

In some further examples, user input indicative of a perceived relevance of at least one of the selected knowledge articles that is presented on the display terminal associated with the contact center agent is received.

In some further examples, user inputs, each indicative of a perceived relevance of a first of the selected knowledge articles that is presented on the display terminals associated with respective contact center agents, are analyzed, and selection criteria for subsequent use in selecting a candidate set of knowledge articles for presentation is adjusted based on results of the analyzing.

Another aspect, in general, relates to techniques for allowing contact center agents or managers to review and relate ongoing and past conversations (for instance, occurred with the same caller) to gain business insights. For example, a word spotting engine of a contact center system is used to process audio data representative of interactions between contact center callers and contact center agents to identify in the audio data putative occurrences of one or more keyphrases of a predefined set of keyphrases. An agent-specific visual representation of the putative occurrences of the one or more keyphrases in the audio data is generated and can be presented on a display terminal associated with a contact center user. Upon receiving input from the contact center user to playback a portion of the audio data in a vicinity of a putative occurrence of a keyphrase, an enhanced version of the agent-specific visual representation is presented on the display terminal while the portion of the audio data in the vicinity of the putative occurrence of the keyphrase is provided through an audio output associated with the contact center user.

Embodiments may include one or more of the following features.

The agent-specific visual representation may be presented among a group of agent-specific visual representations on the display terminal associated with the contact center user. Upon receiving input from the contact center user to participate in the ongoing interaction between the contact center caller and the contact center agent, an audio cut-through transmission may be enabled between an audio input associated with the contact center user and one or more audio channels associated with the contact center agent and contact center caller.

The enhanced version of the agent-specific visual representation may include a visual indicator of whether the corresponding interaction between the contact center caller and the contact center agent is ongoing.

Another aspect, in general, relates to techniques for processing, by a word spotting engine of a contact center system, audio data representative of a plurality of interactions between pairs of contact center callers and contact center agents to identify, in the audio data, putative occurrences of one or more keyphrases of a predefined set of keyphrases; and generating data based at least in part on results of analyzing characteristics of the putative occurrences.

The techniques described in this document can be applied in many contact center context to benefit both contact center performance and caller experience. For instance, such techniques can help contact center increase agent efficiency, reduce average handling time, increase compliance/risk mitigation, and increase sales effectiveness. It can also help increase quality assurance and supervisor effectiveness. By providing customers with improved calling experiences, contact centers or the associated business entities can also increase customers' brand affinity and create stronger relationship with consumers.

Other features and advantages of the invention are apparent from the following description, and from the claims.

DESCRIPTION OF DRAWINGS

FIG. 3 shows an example of knowledge articles.

FIG. 4 shows a topic administration function in an agent assist application.

FIG. 5 shows an article administration function in an agent assist application.

DETAILED DESCRIPTION

1 Integrated Real-Time Call Monitoring and Analytics

Figure 1:
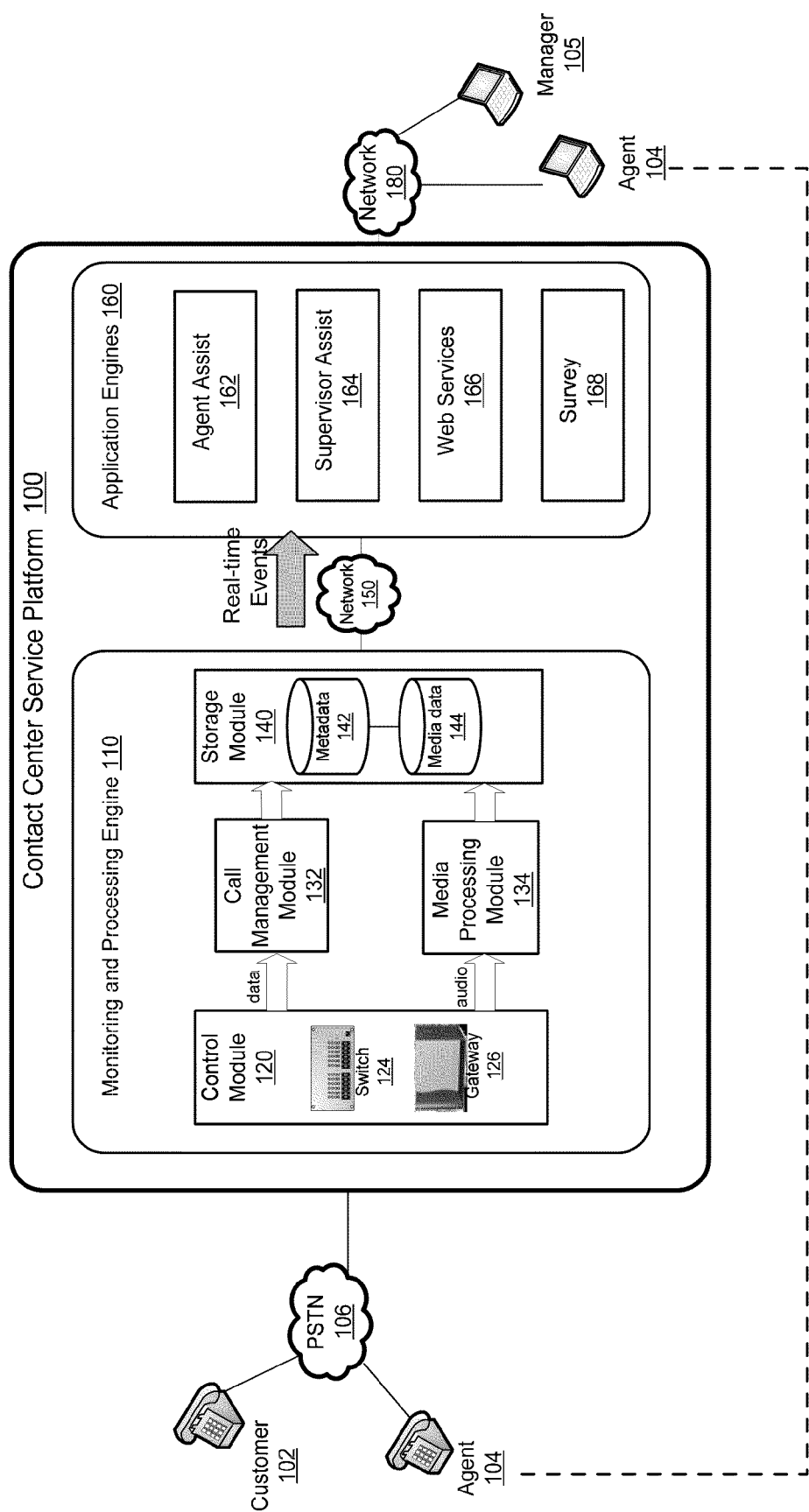
FIG. 1 is a block diagram of an example of a contact center service platform with integrated call monitoring and analysis.

Referring to FIG. 1, one embodiment of a contact center service platform 100 is configured for providing integrated call monitoring and analytics in real time. In this embodiment, the contact center service platform 100 implements at least two types of service engines. A monitoring and processing engine 110 is configured for connecting customers and agents (for example, through voice calls), monitoring and managing interactions between those two parties, and extracting useful data from past and ongoing interactions. Based on audio data representative of ongoing interactions and/or the extracted data, a set of application engines 160 are configured for performing content-based analyses (such as knowledge article recommendations), for instance, to help improve agent response and generate targeted messages.

Very generally, a customer 102 contacts a contact center by placing telephone calls through a telecommunication network, for example, via the public switched telephone network (PSTN) 106. In some implementations, the customer 102 may also contact the contact center by initiating data-based communications through a data network (not shown), for example, via the Internet by using voice over internet protocol (VoIP) technology.

Upon receiving an incoming request, a control module 120 in the monitoring and processing engine 110 uses a switch 124 to route the customer call to a contact center agent 104. Once call connections are established, a media gateway 126 is used to convert voice streams transmitted from the PSTN 106 or from the data network (not shown) into a suitable form of media data compatible for use by a media processing module 134.

In some applications, the media processing module 134 records voice calls received from the media gateway 1126 and stores them as media data 144 in a storage module 140. Some implementations of the media processing module are further configured to process the media data to generate non-audio based representations of the media files, such as phonetic audio track (PAT) files that provide a searchable phonetic representation of the media files, base on which the content of the media can be searched. Those non-audio based representations are stored as metadata 142 in the storage module 140.

The monitoring and processing engine 110 also includes a call management module 132 that obtains descriptive information about each voice call based on data supplied by the control module 120. Examples of such information includes caller identifier (e.g., phone number, IP address, customer number), agent identifiers, call duration, transfer records, day and time of the call, and general categorization of calls (e.g., as determined based on touchtone input), all of which can be saved as metadata 142 in the storage module 140. In some applications, information stored in the metadata 142 is also cross linked, for instance, agent IDs can be mapped to additional data such as supervisor IDs, sites, etc.

Data in the storage module 140 can be accessed by the application engines 160 over a data network 150. Depending on the particular implementation, the application engines 1160 may include a set of functional engines each configured for a different analytic task. Examples include an agent assist engine 162, a supervisor assist engine 164, a web services engine 166, and a survey engine 168, as will be described in a later section of the document. Contact center agents 104 and managers 105 can interact with some or all of the application engines 160 through a data network 180, which may or may not be the same as the data network 150 coupling the two types of service engines 110 and 160.

In some applications, the monitoring and processing engine 110 is also configured to pass data representative of real-time events through the data network 150 for use by one or more application engines 160. One example of data representative of real-time events includes a stream of audio signals (or processed audio signals) representative of an ongoing conversation between an agent and a caller. Another example includes a phonetic representation of a stream of audio signals, for example, a stream of phonemes, based on which phonetically based searching techniques can be applied to extract useful information.

By analyzing the content of the on-going conversations (e.g., based on the data passed via the data network 150) and associating the conversations with existing knowledge (e.g., based on metadata such as caller ID and caller history), one or more of the application engines 160 are configured to deliver real-time support to help agents and managers to properly respond to callers' concerns and interests, thereby improving contact center performance and overall customer satisfaction.

2 Applications

2.1 Agent Assist

One example of an application engine 160 is an agent assist engine 162 configured for monitoring conversations in real time to provide agents with targeted messages and knowledge articles relevant to the ongoing conversation and/or the present caller.

Figure 2:
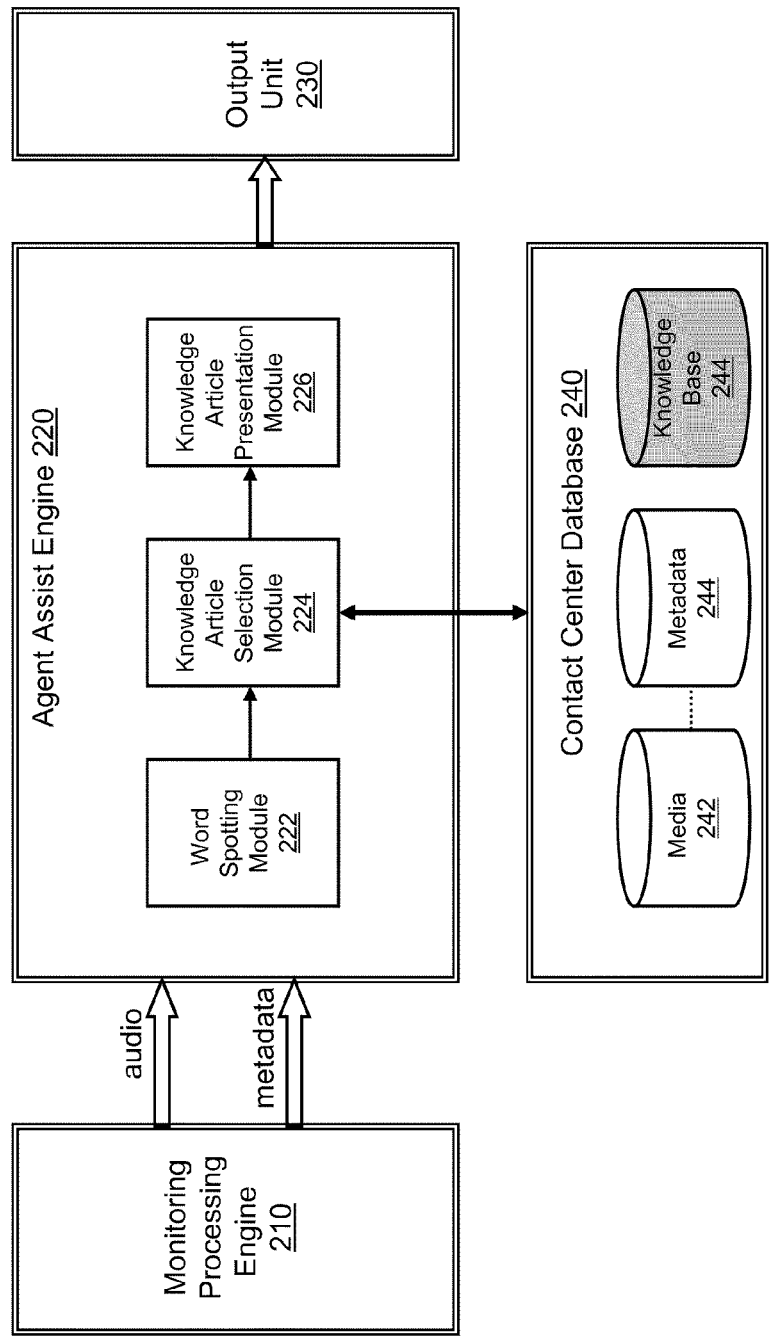
FIG. 2 is a block diagram of one embodiment of an agent assist application engine.

Referring to FIG. 2, one embodiment of an agent assist engine 220 includes a word spotting module 222, a knowledge article selection module 224, and a knowledge article presentation module 226.

The word spotting module 222 accepts input data provided by a monitoring and processing engine 210 to identify putative occurrences of one or more keyphrases of a predefined set of keyphrases in a conversation. In this example, the input data includes audio data representative of an interaction between a caller and an agent, for example, in the form of a phonetic representation of audio signals. Phonetically based word spotting techniques are applied to the audio data to identify whether the conversation includes predefined keyphrases (e.g., "mortgage," "equity," "payment").

The results of word spotting are provided to the knowledge article selection module 224, which accesses a knowledge base 244 in a contact center database 240 to select a candidate set of knowledge articles for presentation to the agent. The knowledge base 244 provides a repository in which the contact center stores knowledge articles. A knowledge article contains information that can be distributed to agents in response to a call.

In some embodiments, the selection of knowledge articles is based at least on a determined relevance of each knowledge article with the identified phrases. For instance, each keyphrase is mapped to a respective knowledge article in the knowledge base 244 with a corresponding relevance score. An article promoting mortgage products may have a high relevance score to the keyphrase "mortgage," and a low score to the keyphrase "sport." Based on these individual relevance scores, the relevance of a knowledge article to an ongoing conversation can be determined by combining the relevance scores of the article to the keyphrase(s) identified in the conversation. Subsequently, a knowledge article whose combined relevance score to the conversation is higher than a threshold score can be placed in the candidate set of knowledge articles for presentation to the agent. In some examples, the combined relevance score of a knowledge article is determined dynamically. For instance, an initial relevance score is generated by processing a first segment of the audio data of the conversation, and this score is iteratively updated based on the processing of the succeeding segments of the audio data.

In addition to the word spotting results, the knowledge article selection module 224 also makes use of metadata associated with the call to identify relevant knowledge articles. For instance, by obtaining caller ID information, analyzing caller-specific history of contact center interactions, and/or analyzing caller-specific history of product acquisition, the knowledge article selection module 224 can extract information about a particular caller's concerns and interests. Using such caller-specific information in conjunction with the content of the conversation, personalized knowledge article selection can be performed.

Once the candidate set of knowledge articles is determined, the knowledge article selection module 224 identifies from the candidate set one or more knowledge article(s) most relevant to the ongoing conversation (for example, by comparing the relevance scores of the knowledge articles) and outputs data representing the identified knowledge article(s) to the knowledge article presentation module 226.

The knowledge article presentation module 226 forms a visual representation of the identified knowledge article(s) for presentation on an output unit 230 (e.g., on the agent's computer screen). The knowledge article can be presented in various forms to deliver real-time support to agents.

FIG. 3 shows one example in which one or more Alerts are presented through an application interface launched on the agent's computer (shown as "Nexidia Agent Assist"). Here, each Alert may include an article name and a brief description of the Alert. The agent can select to discard or launch a particular Alert, for instance, by responding "No, thanks," "Not relevant," or "Show me more." Once a particular Alert has been selected, the full content of the Alert is presented to the agent.

In some applications, the user interface can be configured to provide various functionalities to help agents respond rapidly to changing business needs and consumer interests. For instance, the content of knowledge articles can include promotions, incentives, service alerts, new products, product accessories, service enhancements, etc. It can also include "tip of the day" alert, enabling coaches/supervisors to quickly create content-based alerts to agents.

FIG. 4 shows an exemplary function of the application interface relating to topic administration. Here, the interface allows a user (e.g., an administrator) to pre-group keyphrases into topics such "frustration," "transfer," "promotion," etc. Each topic includes a set of keyphrases and suggested actions (e.g., show knowledge articles, provide web services, redirect to websites) when a keyphrase occurs in a conversation. For instance, when the word spotting module 222 detects that the agent has spoken "I'm sorry you feel that way," an article titled "showing empathy" will be presented to the agent suggesting appropriate agent behaviors in time of frustration.

FIG. 5 shows another function of the application interface that allows a user to create and edit the content of a knowledge article.

In many implementations, the use of above-described agent assist application engine 220 and the application interface can help contact center agents to reduce talk time and improve service by delivering the right information to the right customer at the right time. It can also help the contact center or associated business entities to maximize revenue opportunities (e.g., by prompting the agents to suggest accessories, promotions, incentives, and other relevant business information to callers).

2.2 Supervisor Assist

Another example of an application engine 160 is a supervisor assist engine 164 configured for enabling a contact center supervisor to track multiple agent-caller interactions in parallel and to listen to (and/or participate in) ongoing interactions if there is a need.

Figure 6:
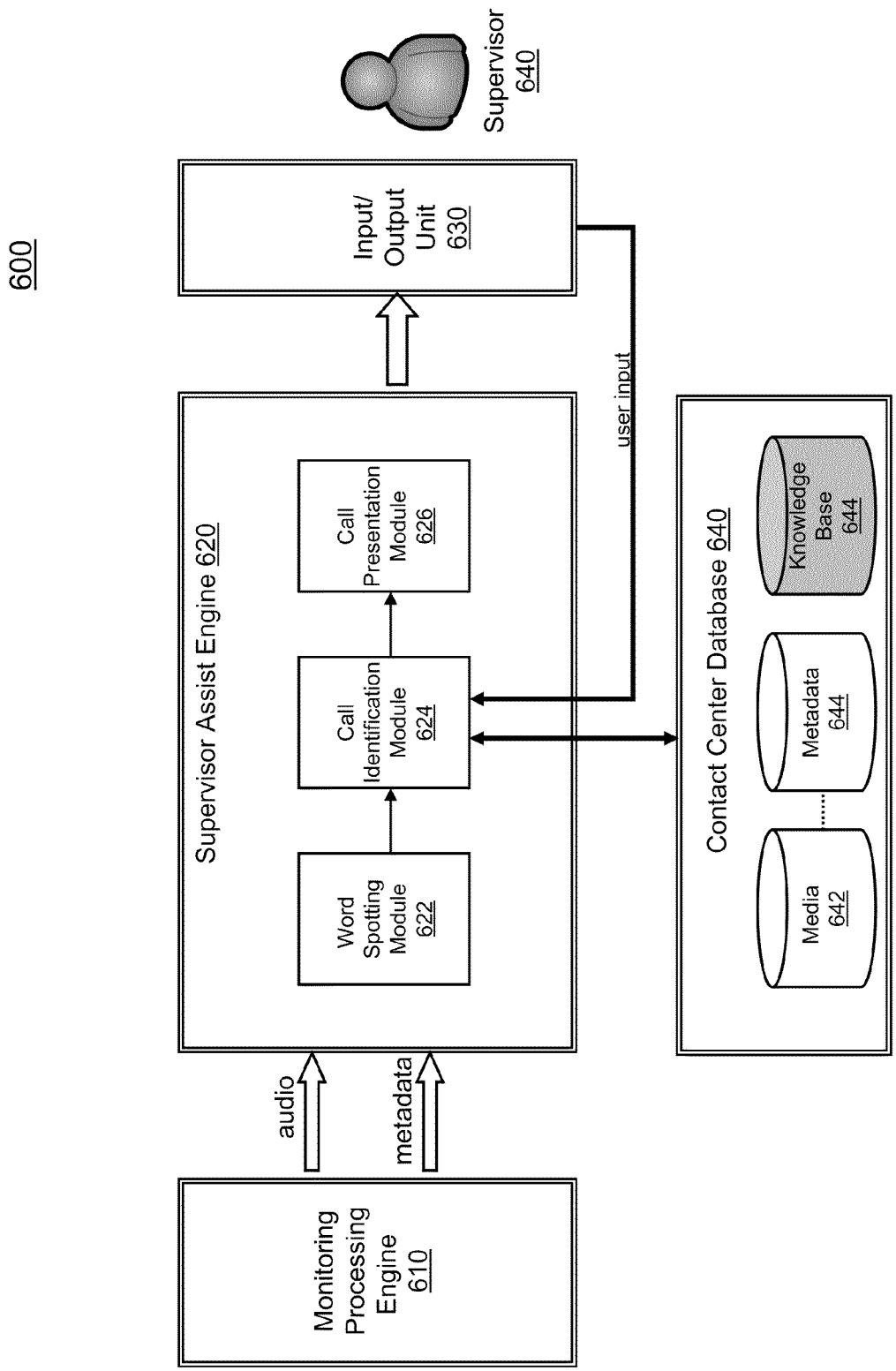
FIG. 6 is a block diagram of one embodiment of a supervisor assist application engine.

Referring to FIG. 6, one embodiment of a supervisor assist engine 620 includes a word spotting module 622, a call identification module 624, and a call presentation module 626. Very generally, the word spotting module 622 accepts audio data provided by a monitoring processing engine 610 and identifies putative occurrences of one or more predefined keyphrases in the audio data. Here, the audio data includes data representative of real-time events (e.g., ongoing conversations), as well as data representative of past events. Using word spotting techniques, conversations that are identified as containing one or more predefined keyphrases can be indexed in a contact center database 640 for subsequent use.

Based on the result of word spotting module 622, the call identification module 624 selects a set of caller-agent interactions for presentation to a supervisor 640 according to dynamically adjustable rules. For instance, the call identification module 624 can group identified conversations based on agent ID, for example, by taking advantage of the ability of the monitoring and processing engine 610 to index audio data at scale (e.g., hundreds of agents) and at fast speed. The call identification module 624 can also identify calls of interest based on attributes selected by the supervisor 640, for instance, specific keyphrases, call durations, call status, and others.

Using data provided by the call identification module 624, the call presentation module 626 generates data representing a visual presentation of the identified calls to be displayed on an output unit 630 (e.g., the supervisor's computer screen). Depending on the particular implementation, data generated by the call presentation module 626 can include specifications of graphical aspects of the presentation (e.g., coloring, text annotation, dynamic vs. static view), the level of detail at which calls will be revealed to the supervisor, status of calls, agent information, and other characteristics of the presentation.

Figure 7:
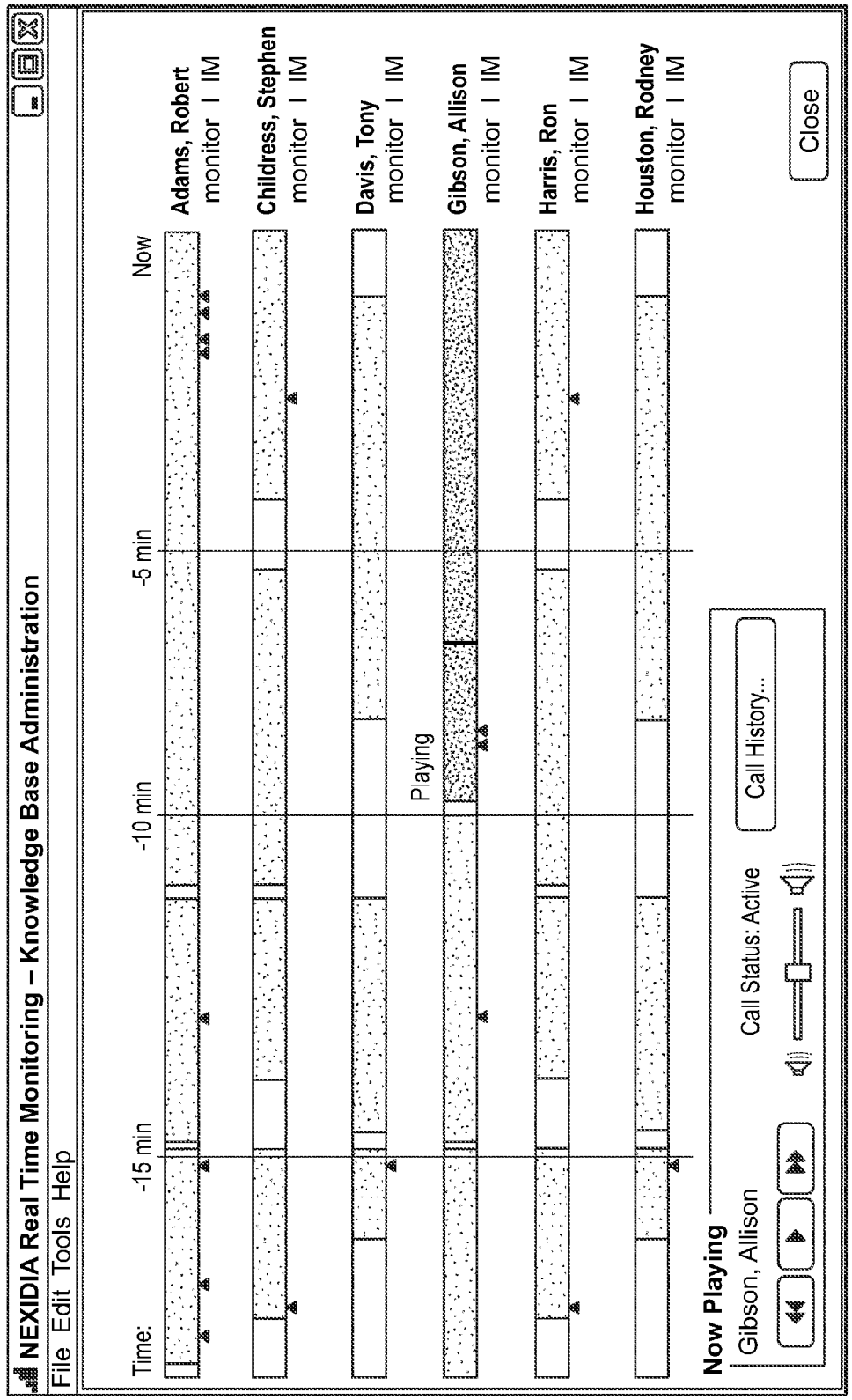
FIG. 7 shows an application interface in the supervisor assist application of FIG. 6.

FIG. 7 shows one example of a visual presentation of past and ongoing conversations displayed in a Nexidia Dashboard application. In this example, agent-specific conversations that occurred during a user-definable time window (e.g., from present time back to twenty minutes ago) are displayed in a dynamic sequence. For instance, for the presentation associated with agent Robert Adams, three audio segments involving agent Robert Adams in the last 20 minutes are displayed in a sequential order, each as a rolling bar. The two end points of a rolling bar can indicate the start and conclusion time of the corresponding conversation. In some examples, multiple groups of conversations can be showed simultaneously in one viewing panel, with each group associated with a respective agent.

The identified occurrences of predefined keyphrases in each audio segment can be highlighted, for example, using triangular pointers as shown in the figure. A user (e.g., a supervisor) can select to playback a portion of an audio segment in a vicinity of an identified keyphrase occurrence to listen to the original conversation between a caller and an agent. Also, upon receipt of user input, the call presentation module 626 can also generate an enhanced presentation of the selected audio segment (or the selected portion of the audio segment) while at the same time, generating an audio output to the user. The enhanced version may provide additional annotations of the selected call, data in the call history, information about the agent and his past behaviors, etc.

In addition to providing review and management functions, the supervisor assist application 620 also allows a supervisor to participate in an ongoing conversation, for example, by providing a cut-through transmission between an audio input associated with the supervisor and one or more audio channels associated with the agent and the caller currently involved in the call.

In this display, various color schemes can be chosen to reflect the status of a call (e.g., past calls vs. ongoing calls). Also, annotations can be added to the display to provide the user with caller information, agent information, call duration, alerts, and etc.

3 Other Embodiments

In some embodiments, the contact center service platform 100 offers an integration of telecommunication-based and data-based networks to enable user interactions in different forms, including voice, Web communication, text messaging, and email. Examples of telecommunication networks include both fixed and mobile telecommunication networks. Examples of data networks include local area networks ("LAN") and wide area network ("WAN"), e.g., the Internet, and include both wired and wireless networks.

Also, customers and agents who interact on the same contact center service platform 100 do not necessarily have to reside within the same physical or geographical region. For example, a customer located in U.S. may be connected to an agent who works at an outsourced contact center in India.

In some examples, each of the two service engines 110 and 160 may reside on a separate server and individually operate in a centralized manner. In some other examples, the functional modules of a service engine may be distributed onto multiple hardware components, between which data communication channels are provided. Although in the example of FIG. 1, the two service engines are illustrated as two separate engines that communicate over the network 150, in certain implementations, they may be integrated into one service engine that operates without the use of data network 150.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method comprising:
   accepting a specification of a predefined plurality of associations between keyphrases of a predefined set of keyphrases and knowledge articles of a predefined set of knowledge articles stored in a machine-readable data store;
   processing, by a word spotting engine of a contact center system, audio data representative of an interaction between a contact center caller and a contact center agent to form an output including identifications of occurrences of keyphrases of the predefined set of keyphrases in the audio data;
   selecting, from the predefined set of knowledge articles, a candidate set of knowledge articles for presentation to the contact center agent based at least in part on a result of processing the identified occurrences of the keyphrases in the output of the word spotting engine according to the predefined plurality of associations; and
   detecting that the interaction between the contact center agent and the contact center caller is ongoing and causing visual representations of selected knowledge articles of the candidate set to be presented on a display terminal associated with the contact center agent during the ongoing interaction; wherein each of the selected knowledge articles of the candidate set is associated with a relevance score that exceeds a threshold score, and wherein the method further comprises:
   comparing the relevance scores associated with the selected knowledge articles of the candidate set to identify the knowledge article of the candidate set that is most relevant to the interaction between the contact centre caller and the contact center agent; and
   generating a visual representation of the identified knowledge article of the candidate set.

2. The method of claim 1, wherein processing the audio data comprises:
   identifying time locations in the audio data at which a spoken instance of a keyphrase of the predefined set of keyphrases is likely to have occurred based on a comparison of data representing the audio data with data representing spoken instances of at least some of the keyphrases of the predefined set.

3. The method of claim 1, further comprising:
   assigning relevance scores to knowledge articles of the predefined set, each relevance score representing a measure of relevance of its respective knowledge article to the occurrences of one or more keyphrases;
   designating a knowledge article of the predefined set as belonging to a candidate set of knowledge articles based on a comparison of its respective relevance score to a threshold score.

4. The method of claim 3, further comprising:
   generating a relevance score to be assigned to a knowledge article of the predefined set, wherein the generating includes:
     processing a first segment of the audio data to generate an initial relevance score; and
     processing one or more additional segments of the audio data to iteratively update the initial relevance score.

5. The method of claim 1, further comprising:
   generating visual representations of selected knowledge articles of the candidate set.

6. The method of claim 1, further comprising:
   prior to comparing the relevance scores associated with the selected knowledge articles of the candidate set,
   processing audio data representative of an immediately prior portion of the interaction between the contact center caller and the contact center agent; and
   updating the relevance score associated with each of the selected knowledge articles of the candidate set based on a result of the processing.

7. The method of claim 1, wherein the predefined set of knowledge articles includes content associated with promotions, incentives, products, product accessories, services, service enhancements, and agent-assisting content.

8. The method of claim 1, further comprising:
   receiving user input indicative of a perceived relevance of at least one of the selected knowledge articles that is presented on the display terminal associated with the contact center agent.

9. The method of claim 1, further comprising:
   analyzing a plurality of user inputs each indicative of a perceived relevance of a first of the selected knowledge articles that is presented on the display terminals associated with respective contact center agents; and
   based on results of the analyzing, adjusting selection criteria for subsequent use in selecting, from the predefined set of knowledge articles stored in a machine-readable data store, a candidate set of knowledge articles for presentation.

10. The method of claim 1 wherein each association of the predefined plurality of associations includes a quantitative score representing a degree of importance of a keyphrase to a knowledge article, and processing the identified occurrences of the keyphrases in the output of the word spotting engine according to the predefined plurality of associations utilizes the quantitative scores.

11. The method of claim 1 wherein at least some of the steps are implemented in a contact center service platform running on a call center switching system.

* * * * *